Aug. 2, 1927.  
J. B. ZIMMERS ET AL  
1,637,367  
AUTOMOBILE INCLOSURE STRUCTURE  
Filed March 26, 1924  
3 Sheets-Sheet 1
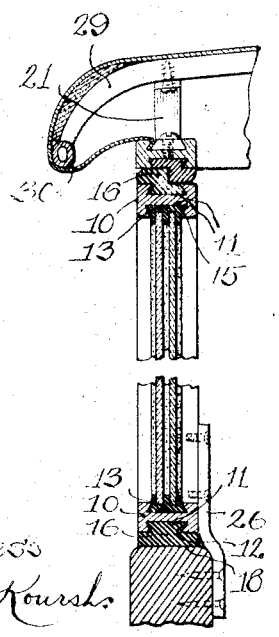
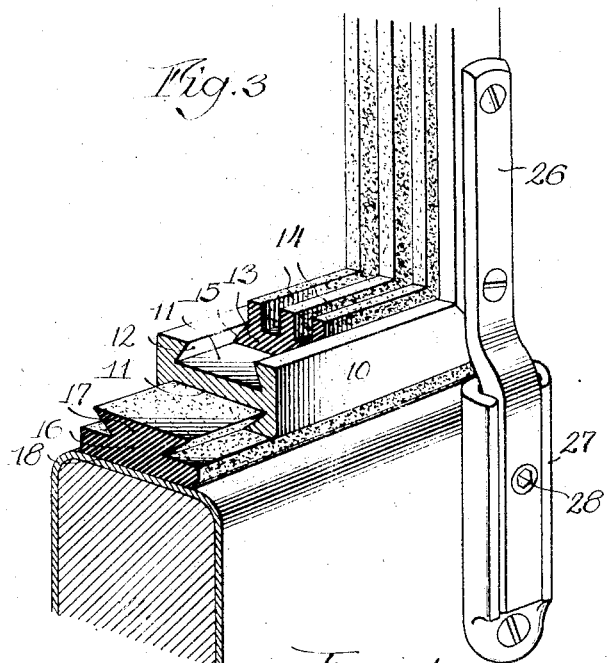

Aug. 2, 1927.  J. B. ZIMMERS ET AL  1,637,367
AUTOMOBILE INCLOSURE STRUCTURE
Filed March 26, 1924   3 Sheets-Sheet 2
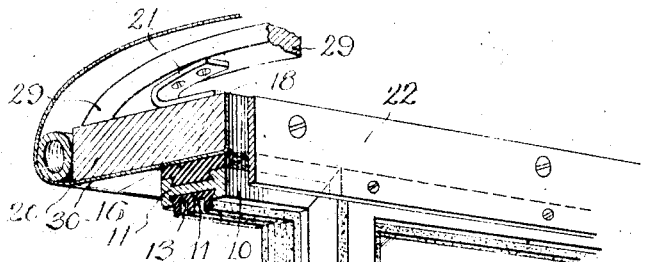
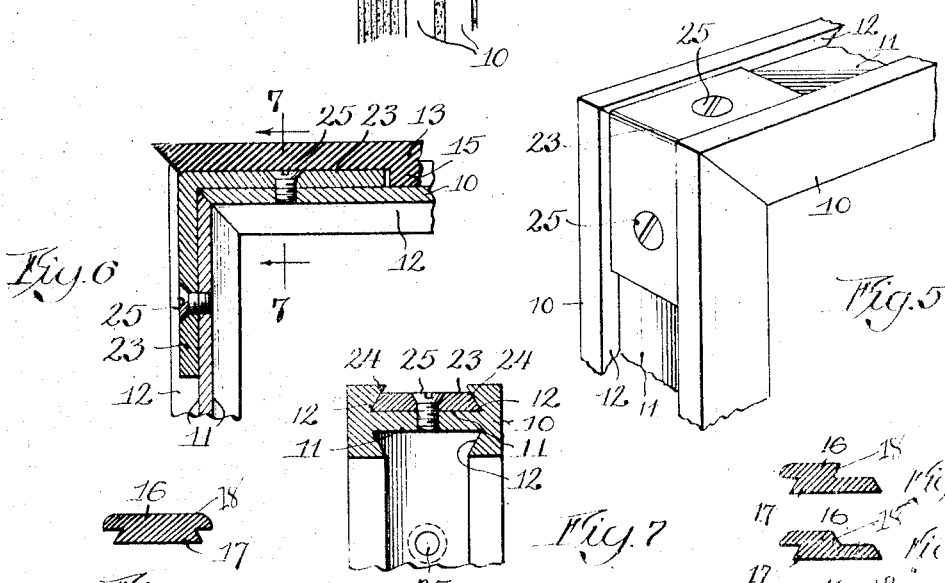
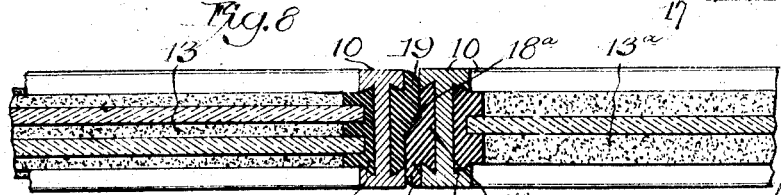

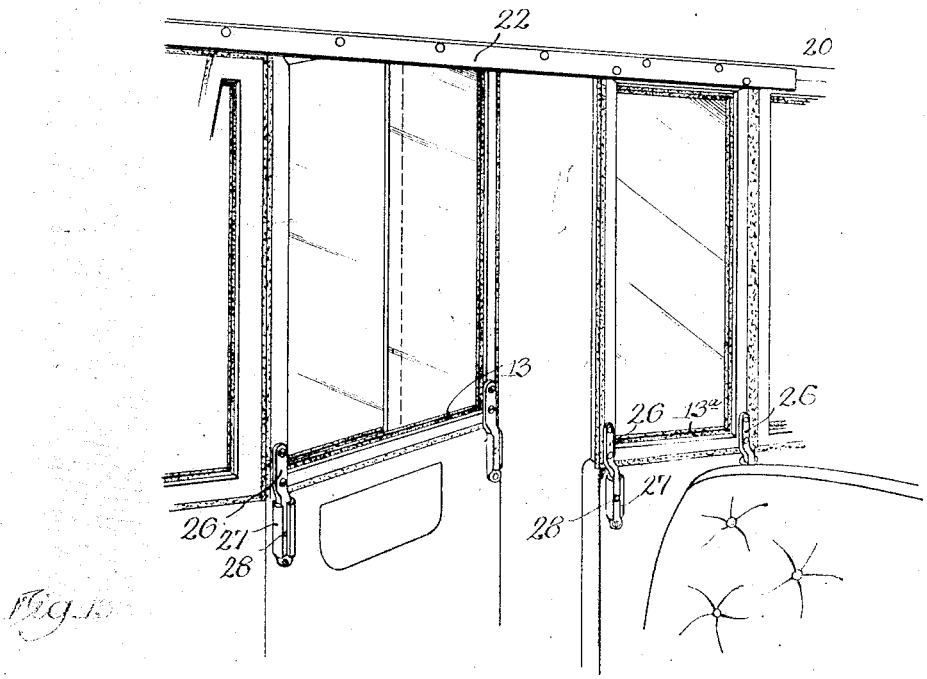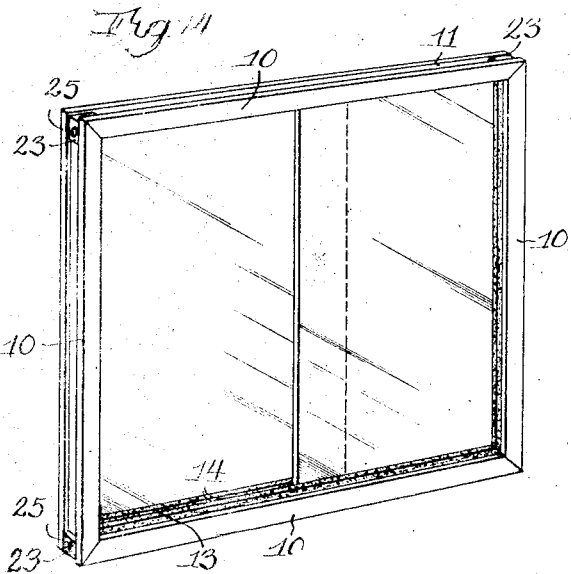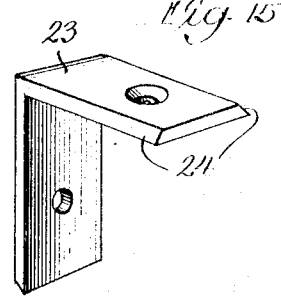

Patented Aug. 2, 1927.

1,637,367

UNITED STATES PATENT OFFICE.

JOSEPH B. ZIMMERS AND OLLIE L. HERRON, OF CHICAGO, ILLINOIS.

AUTOMOBILE INCLOSURE STRUCTURE.

Application filed March 26, 1924. Serial No. 702,011.

This invention belongs to a class of devices for inclosing a vehicle top, and is specifically designed for either permanent top construction or demountable top construction: in either case forming a rigid, weatherproof, noiseless body top; ornamental, economical, compact, durable: also providing a form of construction where replacement becomes a minor item.

Heretofore the permanent inclosed type of automobile has involved a relatively heavy, expensive construction, and one which was mainly limited to special manufacturers and special requirements; also in the types of detachable inclosure the same were curtains or some form of structure which was limited to a certain class of manufacturing, and were more or less cumbersome when not in use as inclosure. The present invention can be used for permanent construction and applied by the skilled workman or the ordinary individual: it can be cut to fit any type of automobile with the simplest tools and at small expense. It has for its objects the production of a simple, efficient, convenient, durable, satisfactory and attractive inclosure of the kind described. To this end the invention consists in the novel elements, construction, arrangement and combination of parts herein shown, described and claimed.

The drawings exhibit one form of the invention wherein Fig. 1 is a side view of an automobile top containing the device. Fig. 2 is a vertical section taken thru a doorway and door. Fig. 3 is a detail of a corner on a sill showing assemblage of parts. Fig. 4 is an upper corner showing a method of attaching the device to a roof. Fig. 5 is a mitred corner showing method of binding, and Fig. 6 is a section of a corner showing a detail. Fig. 7 is a detail of a cross section of Fig. 6 at 7—7. Fig. 8 is a section thru 8—8 of Fig. 1. Fig. 9 is a form of insert used as a gasket or filler between the framing and places where it attaches to the car body or the top. Figs. 10, 11 and 12 are forms of the gasket or filler used where the doors come into contact with the stationary parts. Fig. 13 is a door construction related to stationary parts. Fig. 14 displays the formation and assemblage of a frame and transparency-holding insert. Fig. 15 is a binding angle.

As illustrated it will be seen that we basically construct an inclosure of parts which can be made in stock lengths and can be cut and fitted to the individual case by an ordinary workman with a few simple tools. The parts consist of one preferably metallic member 10, one member 13 preferably of some resilient material like rubber or felt, one member shown in Figs. 9, 10, 11 and 12 preferably of some resilient material like rubber or felt, and a transparent member. The definitely peculiar feature of this invention is the interchangeability of the parts. The channels of member 10 are alike, the basic portion of 13 and 16 are alike and fit either channel of 10. The member 10 may be made of some more or less pliant metal capable of being formed to fit some curvatures as shown in Fig. 1. The member 10 consists of a pair of reverse channels 11 and 11, their bases forming a single partition between them, the one channel being reversed against the other and having restricted openings 12 capable of retaining in said channels by said restricted openings members 13 and 16 which are adapted to be inserted or forced thereinto. At points where the member 10 is mitred we provide an angle 23 having beveled edges 24 to coact with the walls 12 of the restricted opening in member 10; and by use of screws 25 it is made rigid. The member 13 which we preferably make of rubber or felt has a base 15 with bevelled edges adapted to coact with the walls 12 of the restricted opening in member 10, and is capable of being pressed into said channel 11 and retained therein and thereby; the surface of said member 13 has longitudinal channels or rabbets 14 adapted to be retaining channels for windowglass and to permit the movement of windowglass therein: it will be observed that the construction renders the windows practically airtight, weatherproof and anti-rattling: at 13ᵃ we show a form with one channel adapted to positions where no movement of the glass is desired. A third member 16 referred to is of a pliant material preferably rubber or felt having a base 17 with inwardly beveled walls adapting it to be inserted in a channel 11 and coact with the walls thereof to be retained therein and thereby; the surface 18 shown in Fig. 9 is for use where the device comes into contact with the car body structure, and as shown in Figs. 10, 11 and 12 where the parts come into contact with each other in doors or openings as at 18ᵃ; the edge 19 becomes an ornamental division between the metal retainers subject to such treatment as the individual case suggests. At 26, 27 and 28 we show a form of attachment of the device to the body of a car where it is desired to have it removable: where it is meant to be permanent it can be directly attached by hidden means such as will be evident to the ordinary mind. In Fig. 2 we show a preferable form for attaching at the automobile top wherein we use a second member 10 as a plate running the length of the top and attached by supports 21 to the top braces 29, the fabric 30 being held in the upper channel of the second member 10. In Fig. 4 we show the application where a wood plate 20 having a stop 22 is used.

It will be evident that this type of structure and construction may be made highly ornamenatal, give the utmost of clear window space, and be dust proof, weather proof and noise proof. It is simple and economical; can be made in stock material and can be cut, fitted and installed by anyone to any type of vehicle, and can be used to great advantage in initial and permanent top construction adding very little weight to the car.

We claim:—

An article of manufacture for supporting and sealing a transparency comprising a strip having oppositely disposed duplicate longitudinal channels with restricted openings, a flexible member seated in and held in one of said channels—said flexible member having longitudinal rabbets wherein the transparent member may function, a non-sound producing member inserted in and held by the external of said channels to cushion the structure at the point of contact with an associated structure.

Signed at Chicago, Illinois, this 20th day of March, 1924.

JOSEPH B. ZIMMERS.
OLLIE L. HERRON.